United States Patent
Vilozny et al.

(10) Patent No.: US 10,162,613 B1
(45) Date of Patent: Dec. 25, 2018

(54) RE-USABLE RULE PARSER FOR DIFFERENT RUNTIME ENGINES

(71) Applicant: SAP PORTALS ISRAEL LTD., Ra'anana (IL)

(72) Inventors: Efrat Vilozny, Ra'anana (IL); Anita Demayo, Tel-Aviv (IL); Ronen Halbani, Natania (IL)

(73) Assignee: SAP PORTALS ISRAEL LTD., Rana (IL)

( * ) Notice: Subject to any disclaimer, the term of this patent is extended or adjusted under 35 U.S.C. 154(b) by 0 days.

(21) Appl. No.: 15/652,616

(22) Filed: Jul. 18, 2017

(51) Int. Cl.
  *G06F 9/45* (2006.01)
  *G06F 8/41* (2018.01)
  *G06F 3/0481* (2013.01)
  *G06F 17/27* (2006.01)

(52) U.S. Cl.
  CPC ............ *G06F 8/427* (2013.01); *G06F 3/0481* (2013.01); *G06F 17/2725* (2013.01)

(58) Field of Classification Search
  CPC ....................................................... G06F 8/427
  USPC ......................................................... 717/143
  See application file for complete search history.

(56) References Cited

U.S. PATENT DOCUMENTS

| | | | | |
|---|---|---|---|---|
| 8,145,474 B1 * | 3/2012 | Daily | .................. | G06F 11/2257 704/10 |
| 2004/0015473 A1 * | 1/2004 | Trappen | ............ | G06F 17/30607 |
| 2004/0015506 A1 * | 1/2004 | Anonsen | ........... | G06F 17/30427 |
| 2007/0011415 A1 * | 1/2007 | Kaakani | .............. | G06F 12/0269 711/159 |
| 2007/0011660 A1 * | 1/2007 | Garyali | .................... | G06F 9/445 717/127 |
| 2008/0263528 A1 * | 10/2008 | Moore | ................ | G06F 11/3644 717/139 |
| 2010/0199257 A1 * | 8/2010 | Biggerstaff | ............. | G06F 8/456 717/104 |
| 2010/0241828 A1 * | 9/2010 | Yu | ........................... | G06F 8/456 712/30 |
| 2013/0024487 A1 * | 1/2013 | Yi | ......................... | G06F 17/215 708/136 |
| 2013/0086549 A1 * | 4/2013 | Riehl | .................. | G06F 9/45516 717/108 |
| 2013/0204834 A1 * | 8/2013 | Forsee, II | ............. | H04M 3/493 706/52 |
| 2014/0282443 A1 * | 9/2014 | Hoban | .................... | G06F 8/437 717/143 |
| 2014/0282444 A1 * | 9/2014 | Araya | ....................... | G06F 8/42 717/143 |
| 2017/0046139 A1 * | 2/2017 | Yi | .......................... | G06F 8/427 |

* cited by examiner

*Primary Examiner* — Chameli Das
(74) *Attorney, Agent, or Firm* — Buckley, Maschoff & Talwalkar LLC

(57) ABSTRACT

A method and system are provided including a parser module; a display; a memory storing processor-executable process steps; and a parser processor coupled to the memory, and in communication with the parser module and operative to execute the processor-executable steps to cause the system to: provide a user interface to a user via the display, the user interface including one or more data-entry fields; receive an expression in the one or more data-entry fields; transform the expression into a tree structure, wherein the tree structure is usable by two or more different runtime engines; and output the tree structure. Numerous other aspects are provided.

17 Claims, 9 Drawing Sheets

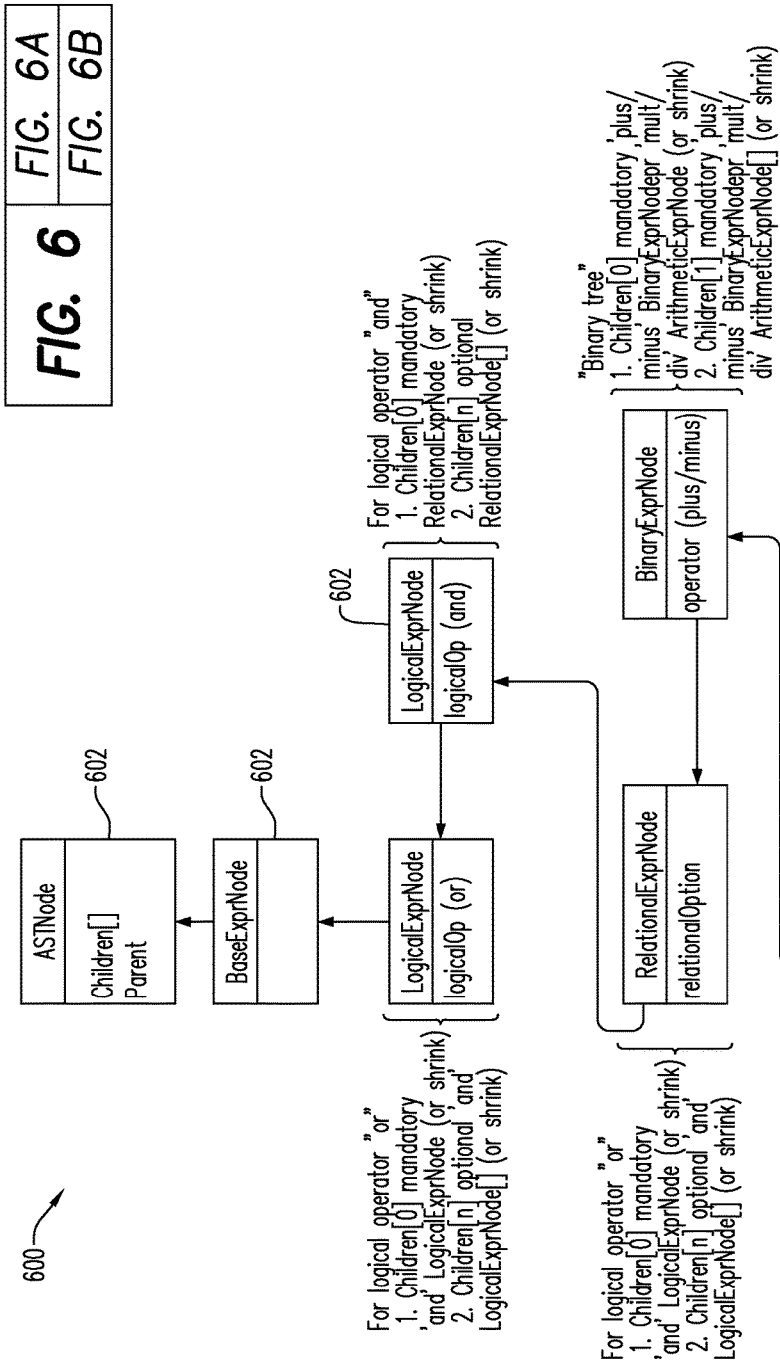

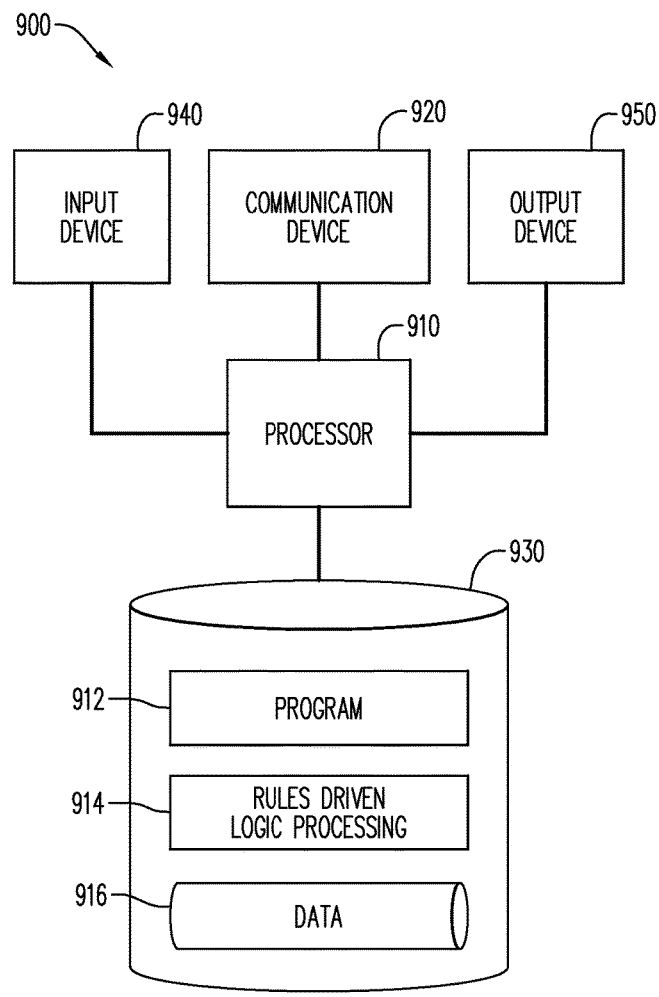

RE-USABLE RULE PARSER FOR DIFFERENT RUNTIME ENGINES

BACKGROUND

A user may add or change logic in a process management system using a software component called a rule engine. The logic or rule may be a statement that describes a policy or procedure. Typically, a single stack framework may handle the rule engine and may provide the ability to build and maintain the rule logic and compile it to an executable runtime. However, the corresponding executable runtime may differ per rule engine (e.g., an ABAP engine generates a class, while a HANA engine generates a SQL Procedure). Further, each rule engine includes its own dedicated parser which defines the grammar that can evaluate an expression received at the rule engine. Conventionally, the parser is not usable between different rule engines.

Systems and methods are desired which support a shareable rule parser.

BRIEF DESCRIPTION OF THE DRAWINGS

FIG. 6, which includes FIG. 6A and FIG. 6B, is an entity diagram of a Parser module architecture according to some embodiments.

FIG. 8 is a table according to some embodiments.

FIG. 9 is a block diagram of a system according to some embodiments.

DETAILED DESCRIPTION

Figure 1:
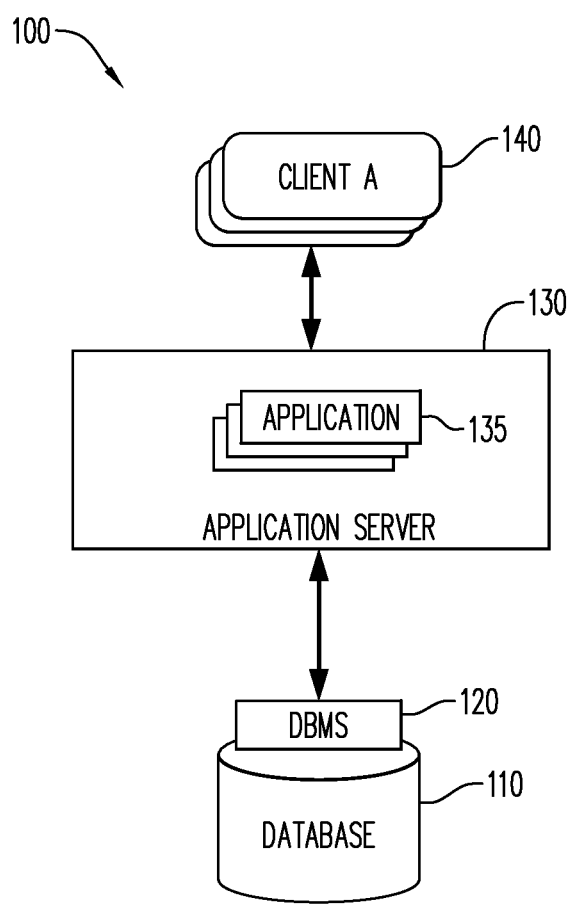
FIG. 1 is a block diagram of a system architecture according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, a typical rule engine is handled as a single stack framework and provides the ability to build and maintain rule logic and compile the rule logic to an executable runtime. However, the executable runtime may differ per engine (e.g., an ABAP engine generates a class, while a HANA engine generates a SQL Procedure). Further, each engine may have its own dedicated parser. The parser may include a defined grammar and analyze a string of words (e.g., a rule or expression) received at the rule engine based on this grammar. For example, the expression may be "Age of the customer=50; Age of the customer is greater than 50, etc. The parser is not typically usable between different rule engines because the parser is tied to a particular programming language.

Conventionally, a compiler, which includes the parser, may be coupled to the rule engine. In these conventional compilers, there is no standalone parser that may run on any browser and provide stateless capabilities of rule parsing adoptable by different rule engines, without any dependency in the realization of the engine and the platform the engine runs on. As such, the parser is coupled with the rule engine and is not usable between different rule engines. The disadvantage of this is that when an application developer is creating an application, they also have to choose a rule engine which is coupled to a specific parser and compiler (the part that generates the execution code). This binds the application to a single runtime flow (for example—generating either SQL procedures, Java® classes, or abap classes, etc.), depending on the selected rule engine (parser+compiler). A proposed solution as described in FIG. 2, decouples the client application, with the embedded parser, from the runtime compiles.

A conventional rule engine flow may provide an end-user with the ability to write rules based on a predefined vocabulary and language tokens.

For example, the vocabulary structure may include: customer associated to payment (1 . . . n), customer associated to country (1 . . . n), and payment having attributes (e.g., date, amount, etc.). The user may like to know, given the customer invoices, the amount a customer paid over $50. Conventionally, the user creates a rule by inputting a structured natural language into a user-entry field in a User Interface (UI), where the content of the rule is based on the input of an application's vocabulary. For example, the user may input the following expression: "paid amount of the customer is greater than 50." A rule engine having a coupled parser and compiler, (e.g., HRF (Hana Rules Framework)), may compile and parse this expression into database queries:

(select * from (select T34. "paid amount" A56 from

"_SYS_BIC"."sap.demo-store.invoice.model/CUSTOMER" T34

Where (A56>47))).

A UI expression editor control may be coupled with the backend (e.g., compiler and parser) and may generate the query based on the input expression. Conventionally, the client side expression editor control may include a lot of complicated parser logic and UI capabilities (such as coloring, autocomplete assistance, etc.) that may only be used by the specific rule engine, and the application designed for running on that rule engine.

Some embodiments may provide a UI expression editor control where the UI expression editor control is decoupled from the application. In some embodiments, expressions may be input to the UI expression editor control ("UI control") in an unstructured close-to-natural language (e.g., "Check if customer is 'John'."). A benefit of the unstructured close-to-natural language feature is that end users are able to ask simple questions that are then turned into a runtime artifact. An output of such a UI control, with the embedded parser, is an Abstract Syntax Tree (AST). An AST is a structure that defines the expression in a way that may be used by multiple different runtime engines to produce a runtime artifact (e.g., an SQL query, a class).

A Parser module may use the input expression, based on the pre-defined vocabulary, to generate the Abstract Syntax Tree (AST) ("tree structure") representation. One or more embodiments transform the text expression, which the compilers at the runtime engines are unable to parse, to an AST which is a structured presentation of the data, easily traversed by compilers. A benefit of embodiments is that the AST effectively provides a structured presentation of the expression understandable by an end user's runtime engine because the AST may be used with any runtime engine.

Some embodiments may provide AST structure that is usable by a compiler, irrespective of the application and rule engine being used. For example, a single AST may be usable by two or more different runtime engines (e.g., JAVA®, HANA, etc.) Some embodiments provide for a process to begin by having an end-user input an expression to at least one user-entry field in a User Interface (UI). The input expression may be received by a UI control. In embodiments, the UI control may maintain the Parser module, including an AST parser component, to be embedded therein.

In some embodiments, the Parser module may include a single interface as input for the AST parser component. A user requesting, via an input expression, data about a set of associated entities (and their attributes), may be provided with a particular format in which to request the data. In embodiments, the AST parser component may include a vocabulary used to define the objects and attributes to be searched (e.g., the actual context of the AST parser component). As used herein, "vocabulary" may refer to a structure containing all of the business domain relevant data. For example, "vocabulary" may refer to a representation model of all entities, their attributes and associations.

In some embodiments, the Parser module may use pre-defined language tokens to build a business expression along with the vocabulary. The combined predefined language tokens and vocabulary may be used to define what can be asked for from a given context of the Parser module. In embodiments, the business expression may provide a context for creating business rule conditions. Once the condition is created, the Parser module may validate the syntax of the business rule condition(s) and if valid, may convert the business rule condition(s) into a pre-defined AST structure.

In embodiments, the AST structure may be used by any engine, regardless of the platform it runs on, and may be traversed upon to create a runtime execution artifact (e.g., SQL, ABAP, JAVA®, etc.) in response to an end-user input expression. In one or more embodiments, an ABAP engine may generate a class as a runtime execution artifact, while a HANA Rule engine may generate a SQL procedure as a runtime execution artifact. The inventors note that this is a benefit of embodiments because conventionally an application developer may have received a business rule, but it could only be used with a HANA Rule engine, for example. Conventionally, if the application developer had Oracle, they would have needed to create a parser to work with an Oracle rule engine, for example.

Some embodiments provide a UI that provides the end user with a way to generate an expression associating entities and attributes without any prior knowledge of the vocabulary structure. As used herein, an "expression" may refer to any combination of operators, constants, functions and other components that evaluates to a single value.

Benefits of some embodiments include: affording the user with the ability to query associated entities without any prior knowledge of the vocabulary structure, making the process more user-friendly and efficient. Benefits of some embodiments include the associated value of re-using the features of a parser (e.g., rich functionality, auto-complete, coloring, etc.).

FIG. 1 is a block diagram of system architecture 100 according to some embodiments. Embodiments are not limited to architecture 100 or to a three-tier database architecture.

Architecture 100 includes database 110, database management system (DBMS) 120, application server 130, applications 135 and clients 140. Applications 135 may comprise server-side executable program code (e.g., compiled code, scripts, etc.) executing within application server 130 to receive queries from clients 140 and provide results to clients 140 based on data of database 110. One such application 135 may comprise a business application.

Application server 130 provides any suitable interfaces through which clients 140 may communicate with applications 135 executing on application server 130. For example, application server 130 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java® Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript® execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by applications 135. Continuing with the business application example, database 110 may include information (e.g., customer information, payment information, country information, etc.), and/or any other data for providing to a business application.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each client 140 may comprise one or more individuals or devices executing program code of a software application for presenting user interfaces to allow interaction with application server 130. Presentation of a user interface as described herein may comprise any degree or type of rendering, depending on the type of user interface code generated by application server 130.

For example, a client 140 may execute a Web Browser to request and receive a Web page (e.g., in HTML format) from a website application 135 of application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA® applet) within a virtual machine. A user may then input an expression to a user-entry field in the user interface to create an AST and ultimately provide data.

As used herein, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Near Field Communication ("NFC") network; a Web Real-Time Communication (RTC) network; a Bluetooth network, a wireless LAN network, and/or an Internet Protocol ("IP") network such as the Internet, an intranet, or an extranet. Note that any devices described herein may communicate via one or more such communication networks.

Figure 2:
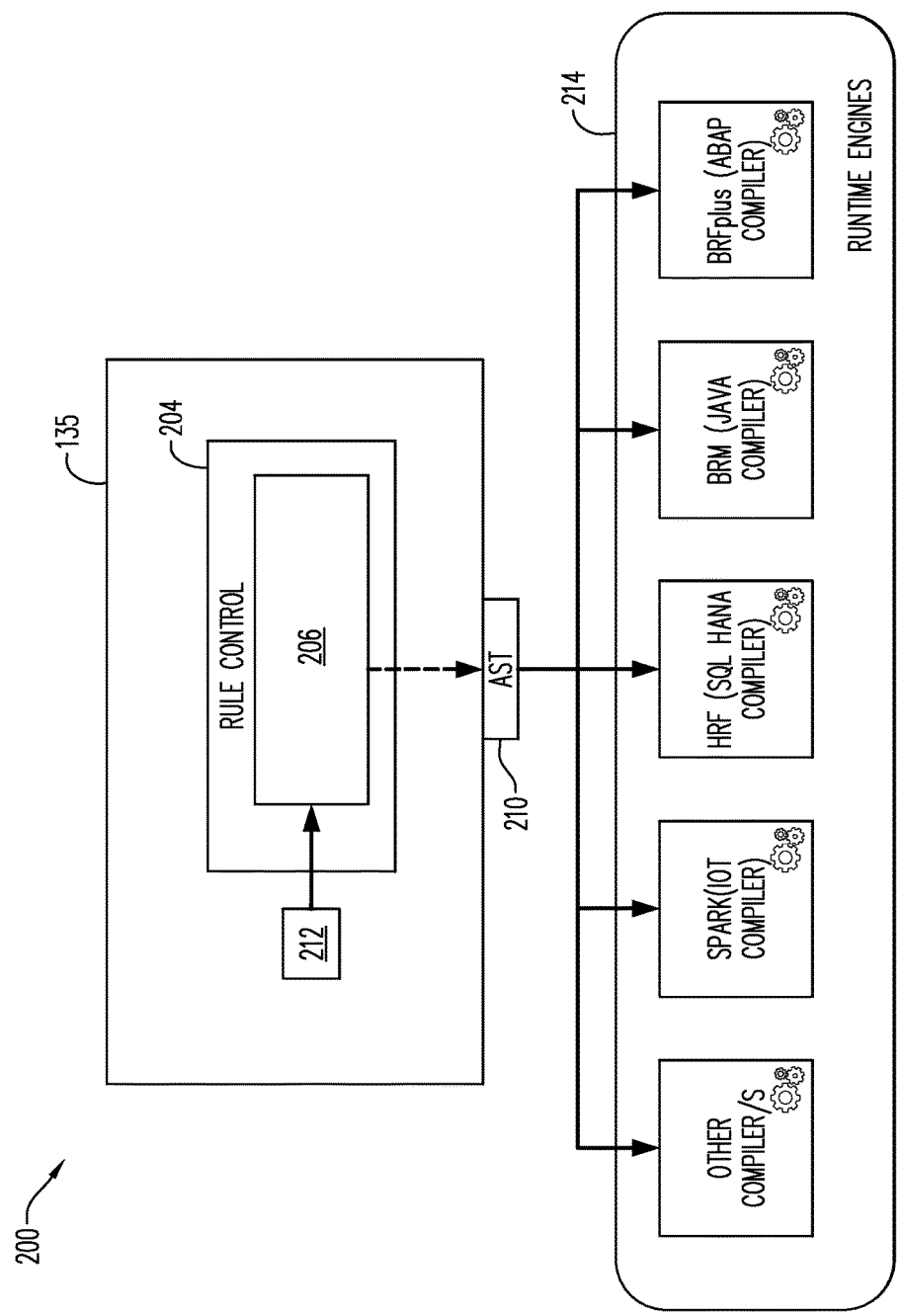
FIG. 2 is block diagram of a system architecture according to some embodiments.
Figure 3:
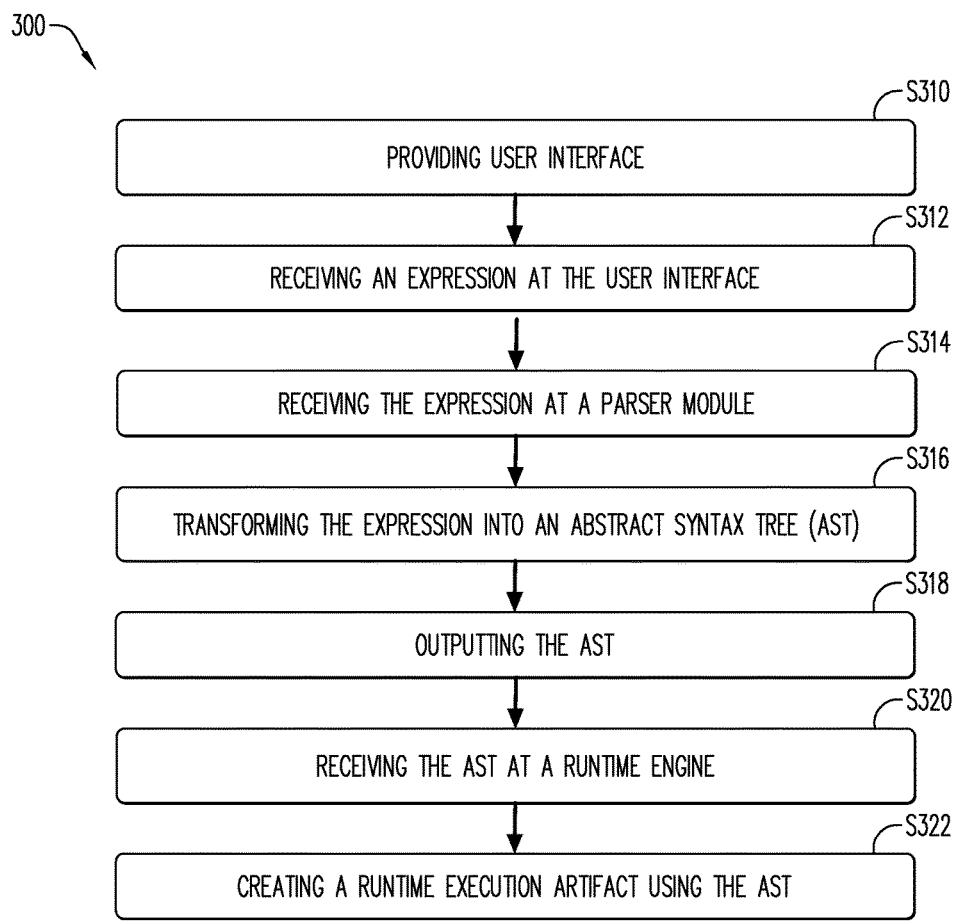
FIG. 3 is a flow diagram of a process according to some embodiments.

FIG. 2 is a block diagram of system architecture 200 according to some embodiments. In one or more embodiments, the application 135 described in FIG. 1 may be an S/4 HANA Fiori App or any other suitable application.

The architecture 200 may also include a User Interface (UI) rule control 204 coupled to the application 135. The architecture 200 may also include a Parser module 206. As used herein, the terms "UI rule control" and "UI expression editor control" may be used interchangeably. In one or more embodiments, the UI rule control 204 may be a UI5 Rule control, or any other suitable rule control. In one or more embodiments, the UI rule control 204 may be a control that may provide an interface to an end user to enter an expression (e.g., ask a question), and then may evaluate the received expression via the Parser module 206. In one or more embodiments, a user may ask a question about a particular vocabulary 212.

In one or more embodiments, the architecture 200 may also include one or more runtime engines 214. As used herein, the terms "runtime engine" and "compilation engine" may be used interchangeably. The Parser module 206 may generate an AST 210. The AST 210 may be used by runtime engines 214 to provide a result in response to the received expression. In one or more embodiments, the UI rule control 204 may be a re-usable control providing a well-defined interface AST 210 as its output, which may be adapted by any runtime engine 214. In one or more embodiments, at least one of the UI Rule Control and the AST are re-usable. The runtime engine 214 may use the AST 210 to compile the rules, authored via the logic of the UI rule control 204, based on the runtime environment of the runtime engine 214.

Figure 4:
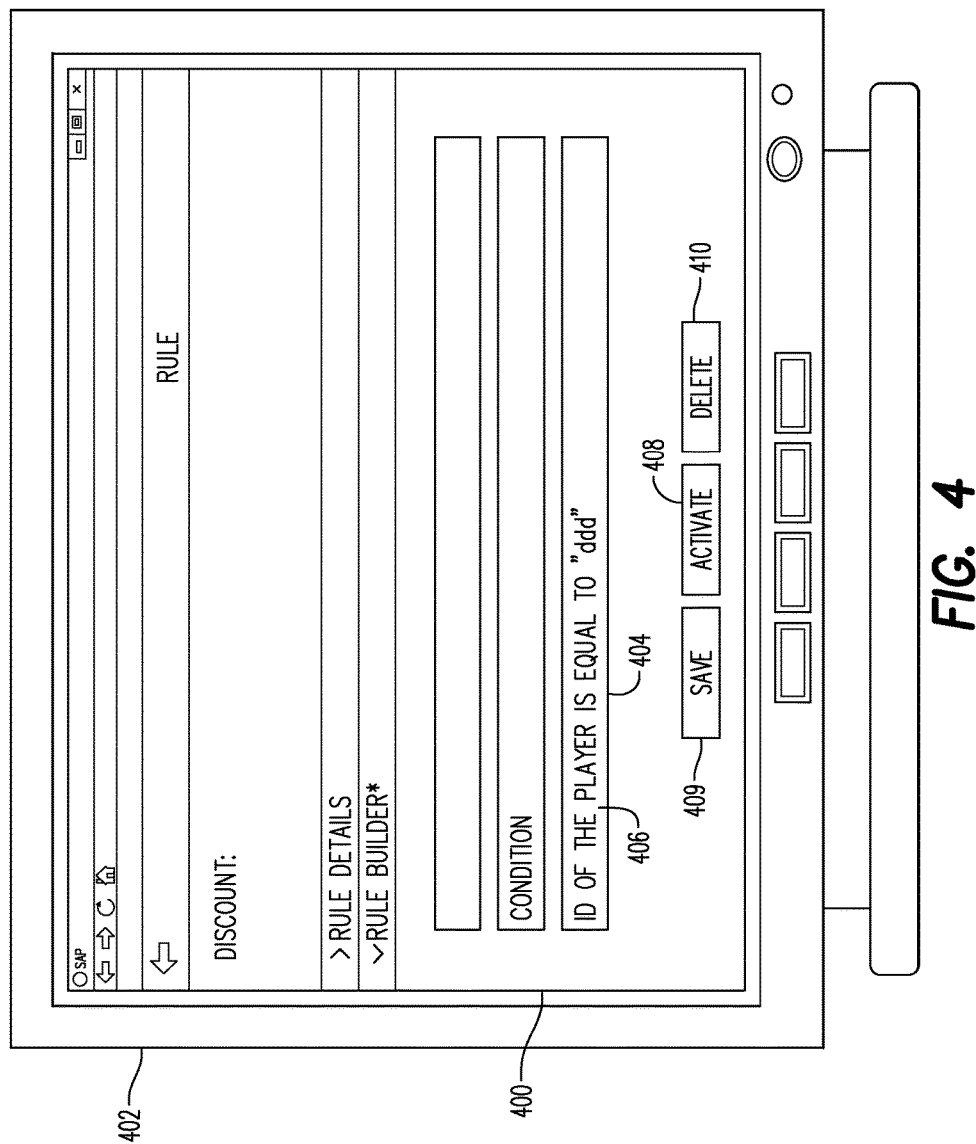
FIG. 4 is an outward view of a graphical interface according to some embodiments.
Figure 5:
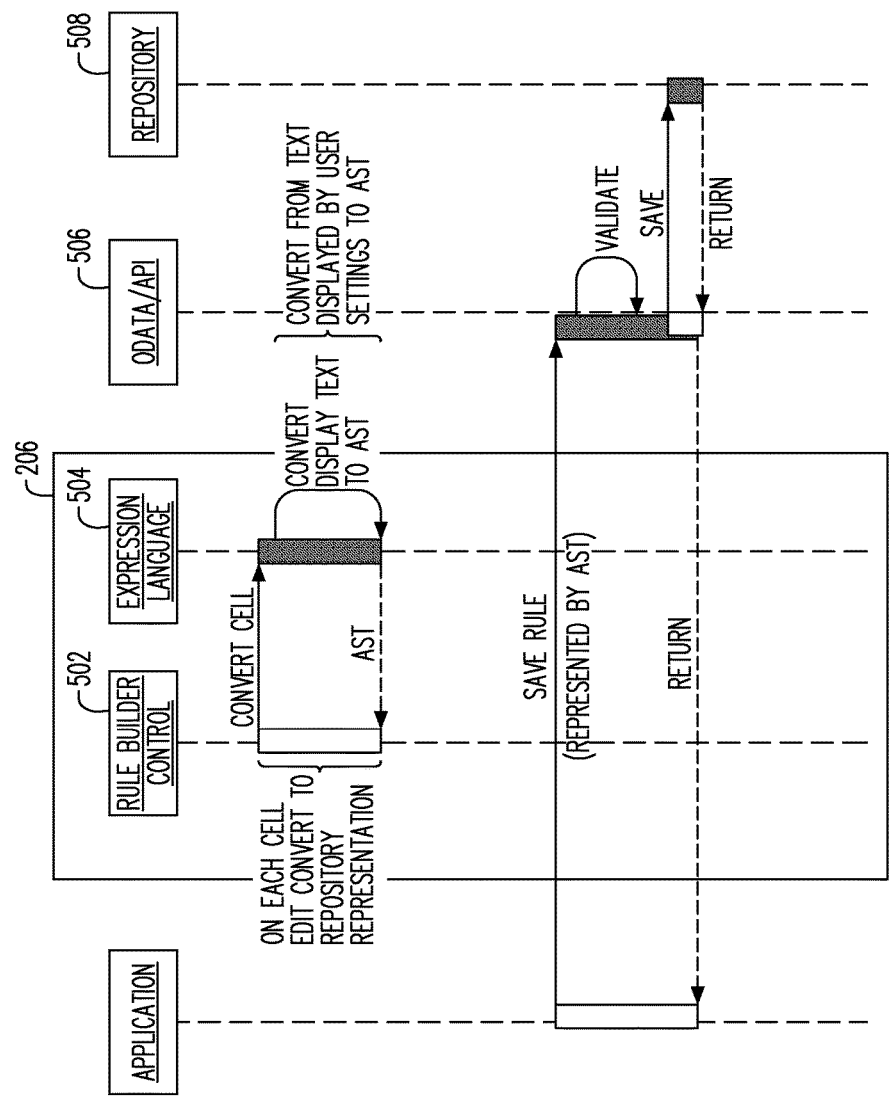
FIG. 5 is flow diagram of a process according to some embodiments.

FIGS. 3-6 include a flow diagram of a process 300 (FIG. 3), a user interface 400 (FIG. 4), a flow diagram 500 (FIG. 5) and an entity diagram 600 (FIG. 6) according to some embodiments. Process 300 may be executed by application server(s) 130 according to some embodiments, to provide a user with access to the user interface 400 (FIG. 4). In one or more embodiments, the application server(s) 130 may be conditioned to perform the process 300, such that a processor 910 (FIG. 9) of the server 130 is a special-purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software. Examples of these processes will be described below with respect to embodiments of the system, but embodiments are not limited thereto. The flow chart(s) described herein do not imply a fixed order to the steps and embodiments of the present invention may be practiced in any order that is practicable.

User interface 400 may be presented on any type of display apparatus (e.g., desktop monitor, smartphone display, tablet display) provided by any type of client device (e.g., desktop system, smartphone, tablet computer). The application which is executed to provide user interface 400 may comprise a Web Browser, a standalone application, or any other application. Embodiments are not limited to user interface 400 of FIG. 4.

As used here, the term "app" refers to a self-contained program or piece of software designed to fulfill a particular purpose.

Initially at S310, a user interface 400 (FIG. 4) is displayed on a user device 402 to an end user. The user interface 400 may include a user-entry text box 404 to receive an expression 406 in one or more embodiments. Then in S312, the expression 406 is received in the user entry text box 404 via entry by the end user.

In one or more embodiments, the expression 406 may include one or more terms to define at least one object and at least one attribute in the expression. The user interface 400 may provide an auto-complete feature whereby the user interface may try to complete the expression for the end user. For example, if the end user enters "sum of a," the auto-complete feature may provide one of "sum of amount" in the text box 404 or may provide a list of words starting with the letter "a" that my complete the expression "sum of a."

The vocabulary model 212 may be assigned to the UI control 204 and to the Parser module 206 by the application. Then, based on the content of the expression (e.g., vocabulary/data model), the end user may enter an expression associated with at least one of the pre-defined language tokens. In one or more embodiments the Parser module 206 may use vocabulary and pre-defined tokens to form a pre-defined structure (AST 210), based on the input to the user interface 400. The AST 210 may then be turned into SQL or other runtime artifacts.

The inventors note that embodiments may empower end users to ask questions in a more natural unstructured language (e.g., English) and then generate those questions into a runtime artifact. In one or more embodiments, the end user may then select an "activate" control 408 to execute the expression or a delete control 410 to end the process. In one or more embodiments, the end user may select a "save" control 409 to save the expression for a later time.

Figure 7:
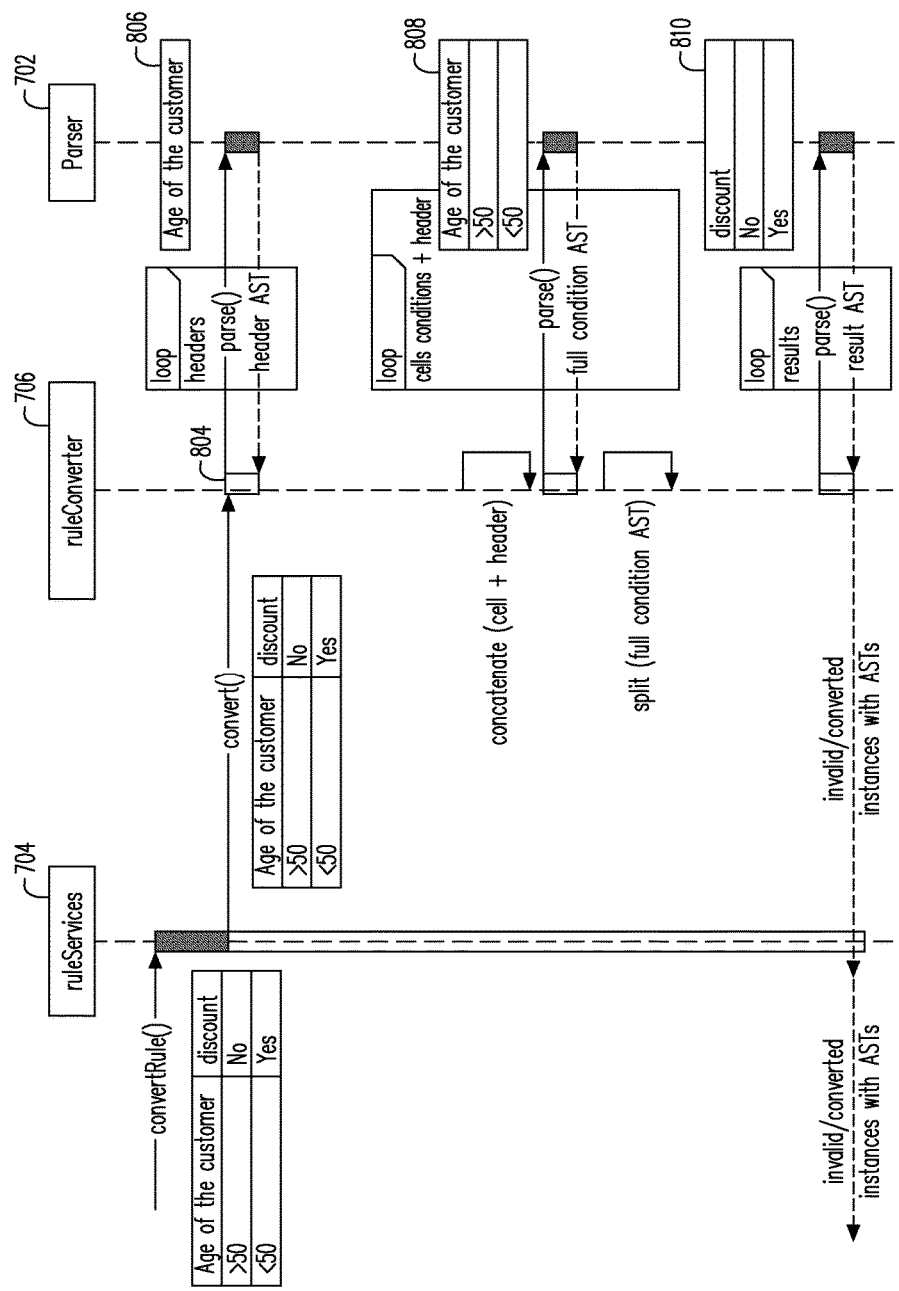
FIG. 7 is a flow diagram of a process according to some embodiments.

In one or more embodiments, after selection of the "activate" control 408, the input expression 406 is received at the Parser module 206 in S314. In one or more embodiments, at the Parser module 206, a rule builder control 502 (FIG. 5) may use an expression language component 504 (FIG. 5) and a parser component 702 (FIG. 7). The rule builder control 502 may create a rule condition based on the context provided by the input expression. In one or more embodiments, the rule builder control 502 may include a rule services 704 (FIG. 7) and a rule converter 706 (FIG. 7). The expression language component 504 may validate the text expression of each rule expression in one or more embodiments. For example, for each expression, the expression language component 504 may analyze the text of the expression by applying at least one grammar rule. When the text of the expression satisfies the grammar rule, it is determined whether there are any other grammar rules. When no other grammar rules exist, the validation is determined to be successful. The expression language component 504 may continue to apply grammar rules to the text of the expression until no grammar rules are available and the evaluation is complete, or until the text of the expression fails one of the grammar rules. When the text of the expression fails one of the grammar rules, an error message may be generated for the end user via the user interface 400.

For example, the error message may state, "The expression cannot contain 'customerrr'."

After the text of the expression is successfully validated, the Parser module 206 may validate the syntax of the rule condition, and if valid, may transform the rule condition to an AST 210 in S316.

Figure 6B:
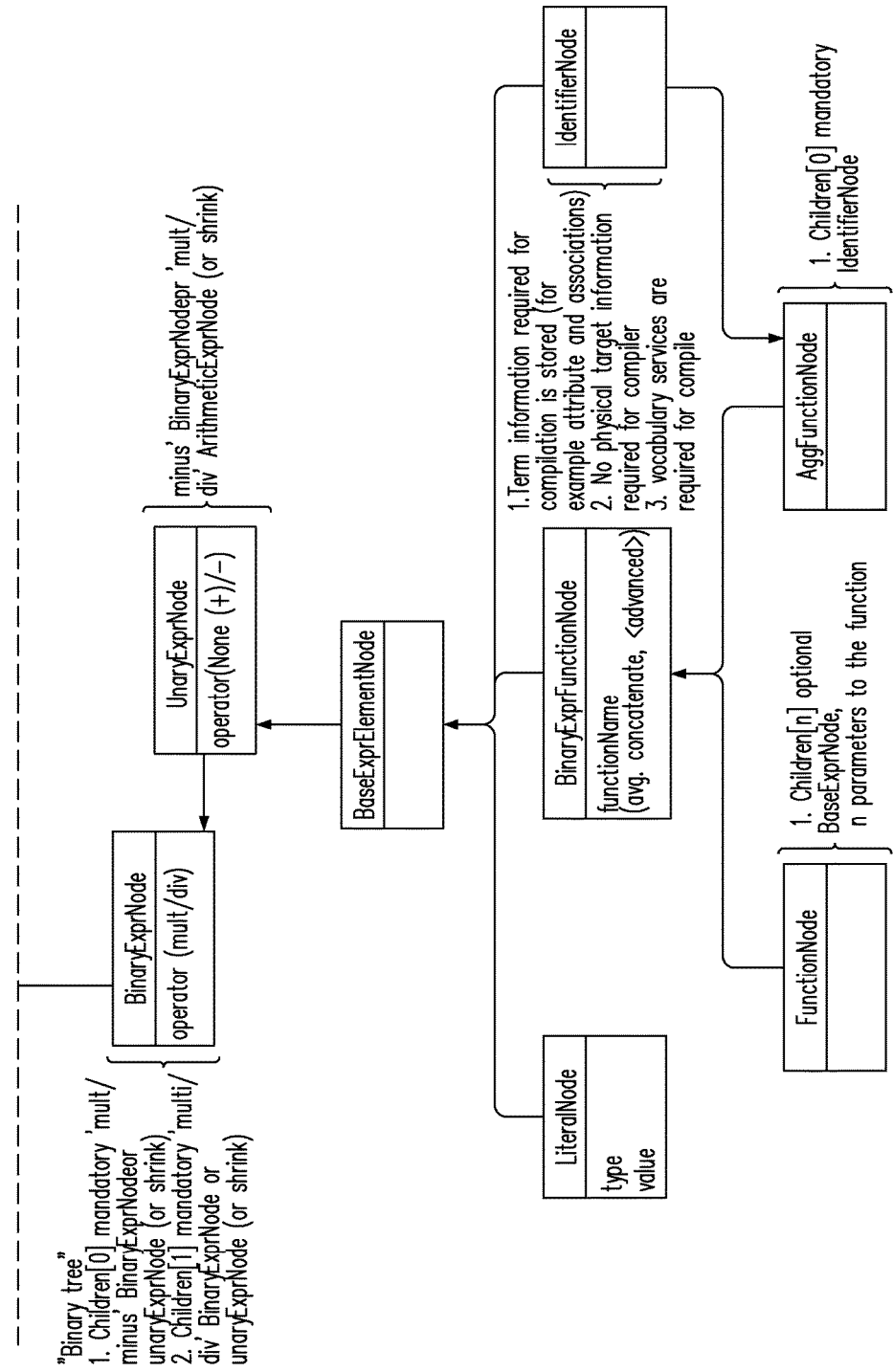

Turning to FIG. 6, a class diagram 600 describing AST 210 node types is provided. In one or more embodiments, the AST 210 may be a well-defined tree that may be exposed externally to the runtime engine 214. The AST 210 may be a nested structure composed of nodes 602 (i.e. node containing children that may contain additional node children, etc.). The nodes 602 may be the building blocks from which different ASTs 210 may be composed. In one or more embodiments, the AST 210 may include one or more different types of nodes 602. The different node types include, but are not limited to, Literal node types, Identifier node types, Function node types, Logical expression node types, Binary expression node types, Relational expression node types and Base expression node types. Each node type may have different characteristics. For example, for a Logical Expression node type with the logical operator "or," for Children (0) may be mandatory and include "and," LogicalExprNode, while Children(n) may be optional "and," logicalExprNodes[ ]. As another example, for an Identifier node type, term information that may be required for compilation may be stored (for example attribute and associations), no physical target information is supplied for the compiler, and therefor vocabulary services may be required for the compiler. In one or more embodiments, each node 602 may have a JSON representation. As such, a specific AST representing a specific condition/expression may be represented by the JSONs of all of the nodes it contains.

In one or more embodiments, after the AST 210 is generated in S316, the AST 210 may be validated via an Odata/API component 506. In one or more embodiments, the validated AST 210 may be saved in a repository 508. The repository 508 may be any suitable storage.

Turning back to the process 300, at S318 an AST 210 is output from the Parser module 206. In one more embodiments, the AST 210 may be returned to the application 135. Then in S320, the AST 210 may be received at the runtime engine 214. Next, at S322, the runtime engine 214 may compile the AST 210 and create a runtime execution artifact using the AST 210.

As a non-exhaustive example, if the input expression 406 is "sum of amount of all invoices is greater than 30 and date of the invoice is after 1/1/2017," the AST 210 may be:

```
{
  "kind": "LogicalExpr",
  "operator": "and",
  "children": [
    {
      "kind": "RelationalExpr",
      "operator": "isGreater",
      "children": [
        {
          "kind": "AggFunction",
          "functionName": "sum",
          "children": [
            {
              "kind": "Identifier",
              "businessType": "Number",
              "isCollection": true,
              "rootObject": "invoice",
              "attribute": "amount",
              "associations": [ ],
              "modifiers": {
```

-continued

```
          "all": true,
          "current": false
        }
      }
    ]
  },
  {
    "kind": "Literal",
    "value": "30",
    "businessType": "Number"
  }
  ]
},
{
  "kind": "RelationalExpr",
  "operator": "isGreater",
  "children": [
    {
      "kind": "Identifier",
      "businessType": "Date",
      "isCollection": false,
      "rootObject": "invoice",
      "attribute": "date",
      "associations": [ ],
      "modifiers": {
        "all": false,
        "current": false
      }
    },
    {
      "kind": "Literal",
      "value": "'2017-01-01'",
      "businessType": "Date"
    }
  ]
}
]
}
```

The structure provided by the above AST 210 may be such that any runtime engine may understand this AST 210, without having to first analyze the text of the expression, and may then use this AST 210 to generate artifacts at runtime. In one or more embodiments, the AST 210 may be written in a JavaScriptObjectNotation (JSON)® format, or other suitable format.

The inventors note that while the example described above relates to the text of an expression, in one or more embodiments, the Parser module 206 may transform a decision table into the AST 210. For example, a sample decision table 800 (FIG. 8) is provided including two rule conditions 802. Rule condition 1 is: if the age of a customer is greater than 50, they do not receive a discount. Rule condition 2 is: if the age of the customer is less than 50, they do receive a discount. Each of the rules 802 in the decision table 800 may be received at the rule builder control 502, as described above. In one or more embodiments, the rule services 704 may be used by UI control to transform the entire decision table rule with all its conditions and outputs expressions to ASTs and vice versa. In this case the rule services 704 may pass the entire rule to the rule converter 706. The rule convertor may use the parser to convert each expression to an AST (or the other way around—from AST back to text expressions). Then the converted rule (represented as collection of ASTs for conditions and outputs) may be later saved by the application to the repository.

In one or more embodiments, the parser component 702 may parse a header 806 of the table. In the example described above, one of the header's is "Age of the customer" 806. The parser component 702 may then transform the header 806 into a header portion of the AST 210. Next, the parser component 702 may parse the cell condition(s) 808 in the table 800 in combination with the header 806, and transform the concatenated header 806 and cell 808 into a condition portion of the AST 210. In order create the ASTs of the header and for the condition, the rule convertor 706 may first combine their texts (header+cell) to a single text expression and then use the parser to get the AST of the combined expression. Then the rule convertor 706 may split it back to two ASTs (one for the header and one for the cell). Then the parser component 702 may parse a result column 810 of the table 800, and transform each cell result into a result portion of the AST 210.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

FIG. 9 is a block diagram of apparatus 900 according to some embodiments. Apparatus 900 may comprise a general- or special-purpose computing apparatus and may execute program code to perform any of the functions described herein. Apparatus 900 may comprise an implementation of one or more elements of system 100. Apparatus 900 may include other unshown elements according to some embodiments.

Apparatus 900 includes a Parser processor 910 operatively coupled to communication device 920, data storage device 930, one or more input devices 940, one or more output devices 950 and memory 960. Communication device 920 may facilitate communication with external devices, such as application server 130. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to manipulate graphical user interfaces and to input information into apparatus 900. Output device(s) 950 may comprise, for example, a display (e.g., a display screen) a speaker, and/or a printer.

Data storage device/memory 930 may comprise any device, including combinations of magnetic storage devices (e.g., magnetic tape, hard disk drives and flash memory), optical storage devices, Read Only Memory (ROM) devices, Random Access Memory (RAM) etc.

The storage device 930 stores a program 912 and/or Parser platform logic 914 for controlling the processor 910. The processor 910 performs instructions of the programs 912, 914, and thereby operates in accordance with any of the embodiments described herein, including but not limited to process 300.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a user interface (UI) rule control, wherein the UI rule control is a re-usable control;
a parser module;
a display;
a memory storing processor-executable process steps; and
a parser processor coupled to the memory, and in communication with the parser module and the UI rule control and operative to execute the processor-executable steps to cause the system to:
provide, by the UI rule control, a user interface to a user via the display, the user interface including one or more data-entry fields;
receive an expression in the one or more data-entry fields;
transform, via the parser module, the expression into Abstract Syntax Tree (AST), wherein the AST is usable by two or more different types of runtime engines to provide a response to the received expression; and
output, via the UI rule control, the AST, wherein the AST is usable by two or more different types of runtime engines to compile one or more rules, authored via a logic of the UI rule control, based on a runtime environment of the runtime engine.

2. The system of claim 1, wherein the AST is a nested structure composed of one or more nodes that defines the expression.

3. The system of claim 1, further comprising processor-executable steps to cause the system to:
receive the AST at the runtime engine;
create a runtime execution artifact using the AST.

4. The system of claim 3, wherein the runtime execution artifact is written in one of SQL, ABAP or JAVA.

5. The system of claim 1, wherein the received expression includes one or more terms to define at least one object and at least one attribute.

6. The system of claim 1, further comprising processor-executable steps to cause the system to:
validate the expression; and
convert the validated expression to the AST.

7. A computer implemented method comprising:
providing, by a user interface (UI) rule control, a user interface to a user, via a display, the user interface including one or more data-entry fields, wherein the UI rule control is a re-usable control;
receiving an expression in the one or more data-entry fields;
transforming the expression into an Abstract Syntax Tree (AST) at a parser module, wherein the AST is a nested structure usable by two or more different types of runtime engines to provide a response to the received expression; and
outputting, via the UI control, the AST, wherein the AST is usable by two or more different types of runtime engines to compile one or more rules, authored via a logic of the UI rule control, based on a runtime environment of the runtime engine.

8. The method of claim 7, wherein the nested structure composed of one or more nodes that defines the expression.

9. The method of claim 7, further comprising:
receiving the AST at the runtime engine;
creating a runtime execution artifact using the AST.

10. The method of claim 9, wherein the runtime execution artifact is written in one of SQL, ABAP or JAVA.

11. The method of claim 7, wherein the received expression includes one or more terms to define at least one object and at least one attribute.

12. The method of claim 7, further comprising:
validating the expression; and
converting the validated expression to the AST.

13. A non-transitory computer-readable medium storing program code, the program code executable by a computer system to cause the computer system to:
provide, by a user interface (UI) rule control), a user interface to a user, via a display, the user interface including one or more data-entry fields, wherein the UI rule control is a re-usable control;
receive an expression in the one or more data-entry fields;
transform the expression into an Abstract Syntax Tree (AST), via a parser module, to provide a response to the received expression; and
output, via the UI rule control, the AST, wherein the AST is usable by two or more different types of runtime engines to compile one or more rules, authored via a logic of the UI rule control, based on a runtime environment of the runtime engine.

14. The medium of claim 13, wherein the AST is a nested structure composed of one or more nodes that defines the expression.

15. The medium of claim 13, wherein program code executable by the computer system causes the computer system to:
receive the tree structure at the runtime engine;
create a runtime execution artifact using the tree structure.

16. The medium of claim 15, wherein the runtime execution artifact is written in one of SQL, ABAP or JAVA.

17. The medium of claim 13, wherein the received expression includes one or more terms to define at least one object and at least one attribute.

\* \* \* \* \*